Figure 1:
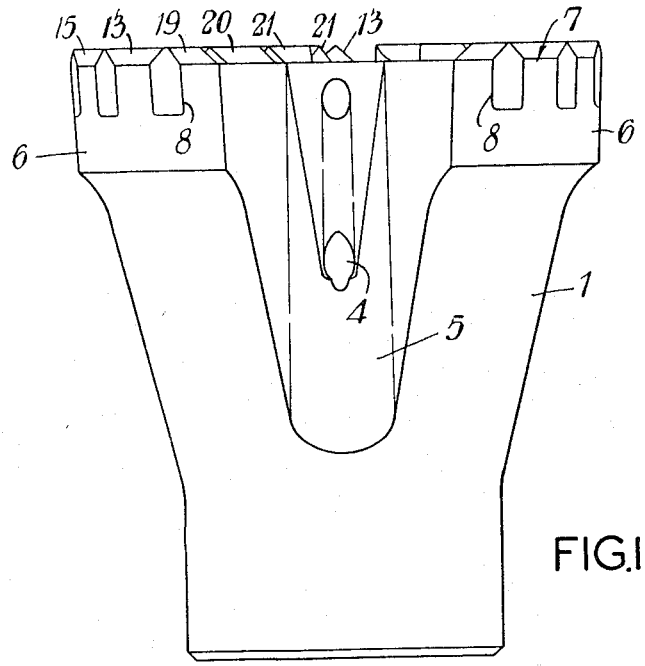

3,299,974
PERCUSSIVE DRILL BITS
Raymond John Clemmow, Dronfield, England, assignor to P. & V. (Mining & Engineering) Limited, Dronfield, England, a British company
Filed Sept. 24, 1964, Ser. No. 399,057
Claims priority, application Great Britain Oct. 1, 1963, 38,569/63
4 Claims. (Cl. 175—410)

The invention relates to percussive drill bits and in particular to the distribution of the cutting edges on inserts let into the working surface of a bit.

Percussive drill bits have tungsten carbide inserts distributed on their working surface so that successive impacts will cause the rock to be broken away. In percussive rotary drilling, the bit rotates through an angle of approximately 30° between each impact to enable the cutting edges of the inserts to strike the rock at a short distance from the previous impact point and thereby facilitate the cutting operation.

If successive impacts are too close together then the bit is working inefficiently in that it is not cutting at its fastest rate, whereas, if successive impacts are too far apart, the rock may not be completely dislodged. It will be appreciated that whilst the angular rotation between successive impacts will be equal for each cutting edge, those edges near the periphery of the working surface of the bit will move a greater arcuate distance than those edges nearer to the centre of the working surface and therefore to obtain even cutting and to equalise the wear on all the cutting edges, the cutting edges must be distributed unevenly.

The need for uneven distribution of the cutting edges has been realised for some time and various attempts have been made to obtain improved cutting. It has previously been proposed to distribute the cutting edges in the form of a letter Z or I but these prior proposals have only made minor improvements in cutting efficiency because the distribution of the cutting edge is very dissimilar to the theoretical optimum distribution. The theoretical optimum distribution of cutting edge is prohibitively difficult to make and sharpen and therefore a compromise has to be reached.

It is the main object of this invention to provide a percussive drill bit having the distribution of the cutting edges arranged to give an increased cutting efficiency over what has hitherto been possible and to equalise the wear on all the cutting edges.

According to the present invention there is provided a percussive drill bit having a working surface with inserts therein, said inserts having cutting edges thereon, in which said surface is divided notionally into at least two concentric cutting regions, the total length of the cutting edge lying within each such region as a proportion of the area of the region within which the length of cutting edge lies being substantially equal for each such region.

It can be shown that ideally, to give the same cutting edge wear rate over the entire working surface of the bit, the lengths of cutting edge when arranged end to end in adjacent cutting regions can follow an involute curve, but this arrangement is prohibitively difficult to make. Consequently, according to the invention, the cutting edges are disposed radially, although other dispositions are possible within the invention, while maintaining as far as practicable, the length of cutting edge appropriate to each concentric region.

Figure 2:
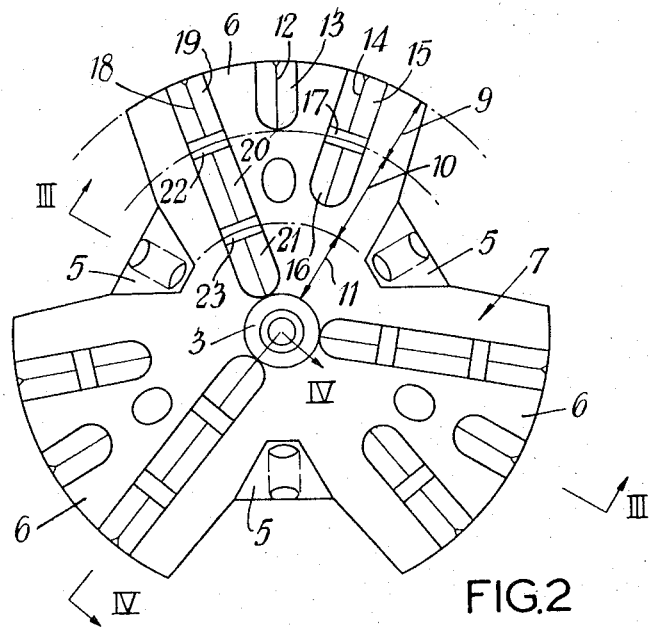
Figure 3:
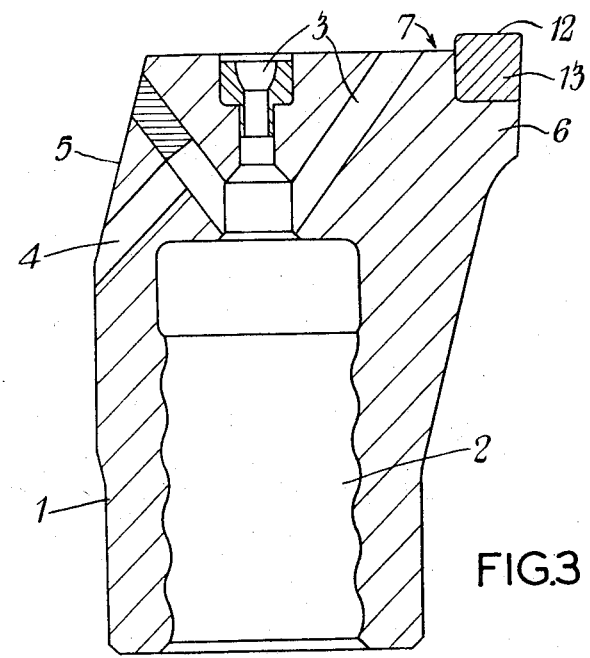
Figure 4:
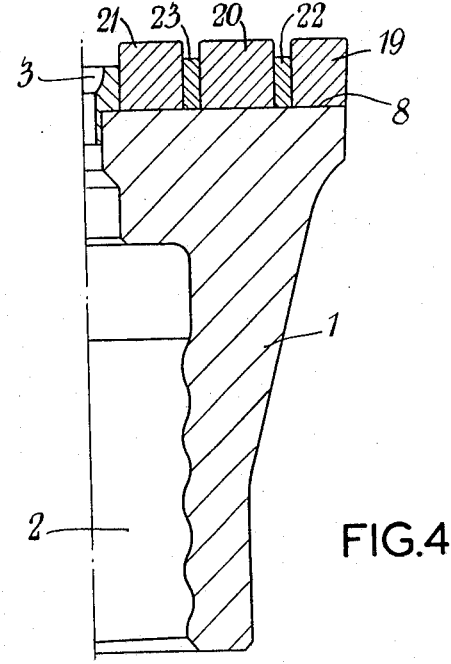

In order that the invention may readily be carried into effect, one embodiment thereof will now be described by way of example only, and with reference to the accompanying drawing, in which:

FIGURE 1 is a side elevation of a percussive drill bit constructed in accordance with the invention;
FIGURE 2 is a plan view of the bit illustrated in FIGURE 1;
FIGURE 3 is a cross-sectional view on the line III—III of FIGURE 2, and
FIGURE 4 is a cross-sectional view on the line IV—IV of FIGURE 2.

As will be seen from the drawing, a percussive drill bit includes a bit body 1 of generally known construction having a bore 2 therein which leads to forwardly facing flushing holes 3 and rearwardly facing flushing holes 4 so that flushing fluid may be directed under pressure to the working face and remove dust and other particles arising from the cutting operation. This dust is forced up the bore hole by the flushing fluid via channels 5, three of which are provided in this embodiment thus defining three wings 6.

The drill bit 1 has a working surface 7 and the present invention is concerned with the distribution on this working surface of inserts having cutting edges. Recesses 8 are formed in the working surface 7 for the reception of the inserts and in order to describe this distribution, the theoretical approach must be mentioned.

As will be seen from FIG. 2, the working surface 7 in this embodiment is divided notionally into three concentric regions the widths of which are indicated at 9, 10 and 11, these being designated the outer region, the central region and the inner region respectively. The diameter of the working surface of the bit under consideration is four inches and the diameter of the central forwardly flushing hole 3 is one quarter of an inch emerging into the working surface at a diameter of one half of an inch. The widths 9, 10 and 11 of the concentric regions are 7/12 inch. The length of cutting edge in each of these regions should be proportional to the volume of rock which has to be removed from that region and since the volume of rock can readily be calculated for each region, this gives, as a proportionality, the length of cutting edge necessary for this region compared with the total length of cutting edge. The factor by which these proportionalities have to be multiplied in order to get the precise lengths of cutting edges, is determined from previous experience in percussive drill bits of this nature. Thus, it is known what total length of cutting edge on the working surface will give the minimum of wear and this total length of cutting edge is divided into the proportionalities previously found and the distribution made accordingly so that the highest cutting rate is achieved.

In this particular embodiment it is found that three radial lines of inserts having cutting edges should be inserted into the recesses 8 in each wing 6. These lines consist of a first line 12, in the mid-position of the wing which extends across the width of the outer region 9. This line consists of a single insert 13, ½ inch in length. A second line 14 extends across both the outer region 9 and the central region 10 and has two inserts 15 and 16 each of which is ½ inch in length and being separated by a gap within which is a spacer 17, ⅛ inch in width. A third line 18 consists of three inserts 19, 20 and 21 which extend across the widths of the outer region 9, the central region 10 and the inner region 11 repsectively, each such insert being of ½ inch in length and being separated by two gaps disposed at the borders between the outer and central regions and the central and inner regions within which are spacers 22 and 23 respectively. The angle between adjacent radial lines of cutting edges in each wing is 20° and this means that with successive impacts being at an angle of approximately 30°, the cutting edges will not fall precisely within a previous impact line.

It will thus be seen that the relative lengths of cutting edge in the regions 11, 10 and 9 is in the proportion 1:2:3 respectively. This is the practical proportionality derived from the theoretical proportionality of 1:2.07:3.15 (the relative areas of the regions being $91/36:189/36:287/36$).

However, with a bit of 2½ inch diameter and the diameter of the central forwardly flushing hole one quarter of an inch in diameter emerging into the working surface at a diameter of one half of an inch and divided notionally into three concentric regions of equal width of 4/12 inch, the practical distribution of cutting edge would be for the inner, central and outer regions, 1:1.75:2.5 respectively. This is derived from the theoretical proportionality of 1:1.8:2.6 (the relative areas of the regions being $40/36:72/36:104/36$).

In a further example (not shown in the drawing) of a bit constructed according to the invention, the working surface is divided notionally into four concentric regions. The radius of the entire working surface is two inches and the outer region is that lying within the periphery and a circle of 1½ inch radius, the second region is that between circles of 1½ inch and 1 inch radius, the third region is that between circles of 1 inch radius and ½ inch radius, and the inner region is that between circles of ½ inch and ¼ inch radius. In the outer region there are nine lengths of cutting edge each of 0.31 inch long; in the second region six lengths of cutting edge of each of 0.4 inch long; in the third region three lengths of cutting edge each of 0.4 inch and in the inner region one length of cutting edge 0.25 inch long. If the bit is of the three winged variety as described above, each wing has three inserts in its outer cutting region, two inserts in its second cutting region, and one insert in its third cutting region, with the single insert in the inner cutting region being disposed in any one of the wings. The inserts may be arranged radially in line so that in each wing excluding the inner cutting region there is a triple cutting edge extending across the outer, second and third cutting regions, a double cutting edge extending across the outer and second cutting regions and a single cutting edge in the outer cutting region.

It will be apprectiated that according to the invention if more finely graduated distribution of the cutting edges is desirable, the working surface may be notionally divided into more than four cutting regions but the invention includes the notional division of the working surface into at least two concentric regions.

I claim:
1. In a pecussive drill bit having a working surface divided notionally into inner, central and outer cencentric cutting regions of substantially equal width, said surface having recesses therein, a plurality of inserts disposed within said recesses each said insert having a cutting edge exposed from said working surface and lying in at least one of said regions, the length of cutting edge lying within said inner, central and outer regions being substantially in the ratio of 1:2:3 respectively.

2. In a percussive drill bit having a working surface divided notionally into inner, central and outer concentric cutting regions of substantially equal width, said surface having radial recesses therein, a plurality of radial inserts disposed within said recesses, each said insert having a cutting edge disposed radially and exposed from said working surface and lying in at least one of said regions, the length of cutting edge lying within said inner, central and outer regions being substantially in the ratio of 1:2:3 respectively.

3. In a percussive drill bit having a working surface of winged shape and divided notionally into inner, central and outer concentric cutting regions, said surface having radial recesses therein, a plurality of radial inserts disposed within said recesses and each insert having a cutting edge disposed radially and exposed from said working surface, said inserts constituting a first line extending across the width of said outer region, a second line extending across the width of said outer region and the width of said central region and a third line extending across the width of said outer, central and inner regions in each said wing.

4. In a percussive drill bit having a working surface of winged shape and divided notionally into inner, central and outer concentric cutting regions, said surface having radial recesses therein, a plurality of radial inserts disposed within said recesses and each insert having a cutting edge disposed radially and exposed from said working surface, said inserts constituting a first line extending across the width of said outer region in each wing, a second line constituted by two such inserts extending across the width of said outer region and the width of said central region in each wing and having a gap between said inserts, which gap is located at the border of said outer and central regions and a third line constituted by three such inserts extending across the width of said outer, central and inner regions in each wing and having a gap between each said insert, one said gap being located at the border of said outer and central regions and the other said gap being located at the border of said central and inner regions.

References Cited by the Examiner

UNITED STATES PATENTS

| | | | |
|---|---|---|---|
| 2,507,222 | 5/1950 | Phipps | 175—410 X |
| 2,693,938 | 11/1954 | Roberts | 175—410 X |
| 2,743,495 | 5/1956 | Eklund | 175—410 X |
| 2,903,240 | 9/1959 | Mathewson | 175—398 X |
| 3,163,244 | 12/1964 | Zimmerman | 175—398 |

CHARLES E. O'CONNELL, *Primary Examiner.*

N. C. BYERS, *Assistant Examiner.*